W. LUNDBERG & D. F. LEAHY.
ELECTRIC SIGNALING APPARATUS AND KEY.
No. 184,251.    Patented Nov. 14, 1876.
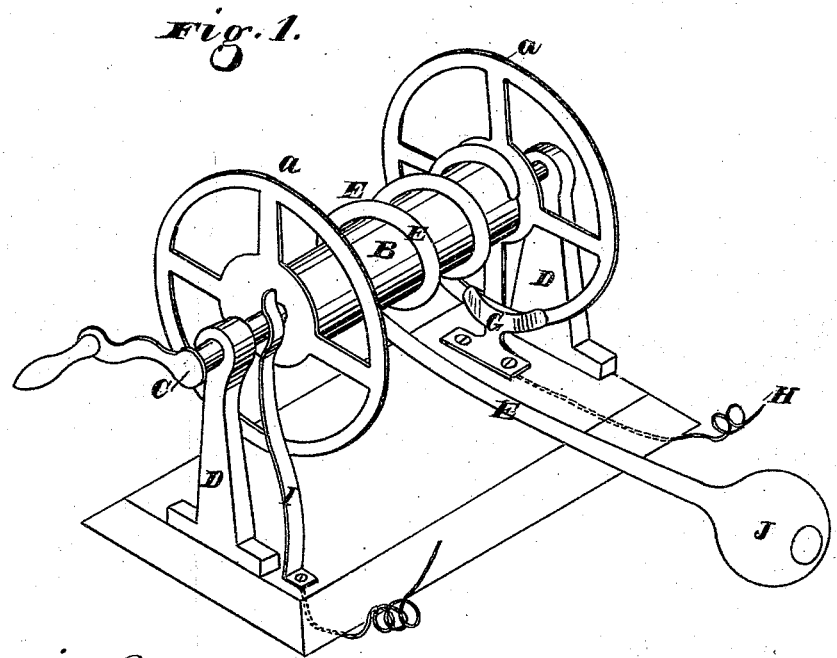
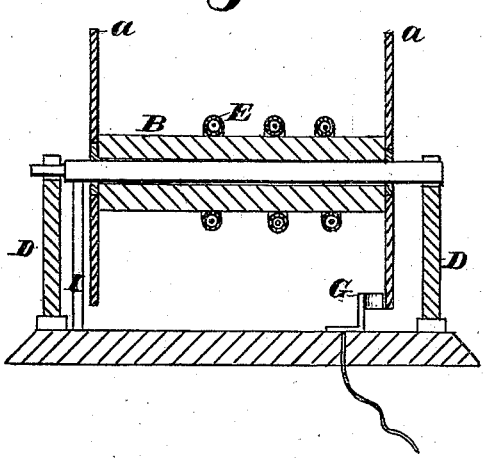
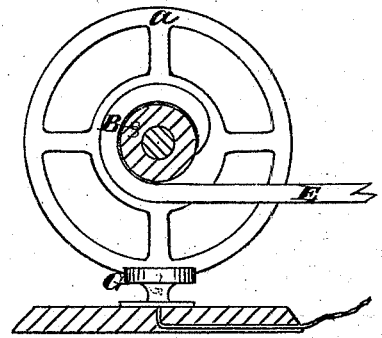
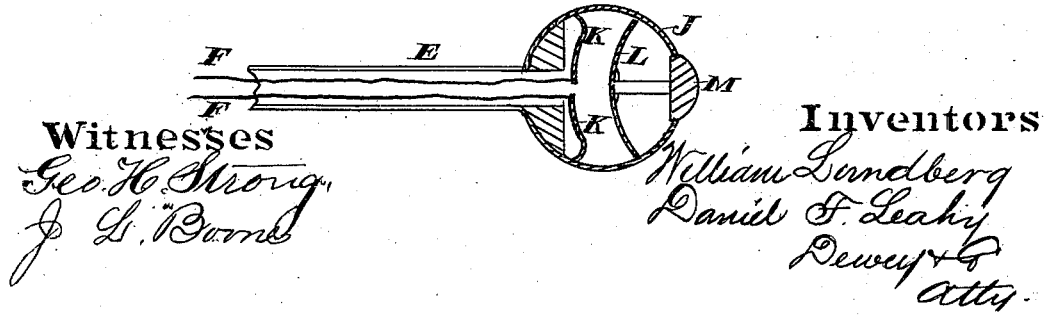

UNITED STATES PATENT OFFICE.

WILLIAM LUNDBERG AND DANIEL F. LEAHY, OF PORTLAND, OREGON.

IMPROVEMENT IN ELECTRIC SIGNALING APPARATUS AND KEY.

Specification forming part of Letters Patent No. 184,251, dated November 14, 1876; application filed September 4, 1876.

*To all whom it may concern:*

Be it known that we, WILLIAM LUNDBERG and DANIEL F. LEAHY, of Portland, in the county of Multnomah and State of Oregon, have invented an Improved Water-Proof Signaling Apparatus and Key; and we do hereby declare the following to be a full, clear, and exact description thereof, reference being had to the accompanying drawings.

Our invention relates to a novel signaling apparatus and key, which are intended to be used by fire-companies, in order to establish a speedy communication from the nozzle at the end of the hose to the engine, or by submarine divers, or in any other place where a system of signals is necessary or desirable to be established speedily from place to place. It consists in the employment of soft-rubber, non-conducting, or other tubing, which contains one or more insulated wires. This tubing is wound upon a reel, from which the necessary connections are made between the wires and the battery and instruments, and the opposite end of the tubing has attached to it our water-proof key, by which communication may be made with the engine or any other point, at will.

Referring to the accompanying drawings for a more complete explanation of our invention, Figure 1 is a perspective view of our device. Fig. 2 is a longitudinal section. Fig. 3 is a transverse section. Fig. 4 is a section of the key.

A A are two metal flanges, which are connected by a wooden or other non-conducting drum, B, upon which the hose containing the wires is coiled. Within this drum is a metallic shaft, C, the ends of which are supported upon standard D, the whole constituting a reel, which, when placed upon an engine or used in any other capacity, operates substantially as set forth and described. The hose E contains one or more conducting-wires, F, and is coiled upon the drum, so that it may be run off at any time to any desired distance. One of the wires, F, is connected directly with the flange A, and the other wire passes through a small hole bored in the non-conducting drum, so as to make a connection with the metallic axle or shaft C. A spring, G, is secured to the base and presses against the flange A, and this spring is connected with one of the wires H from the battery, while a spring-arm, I, pressing against the metallic axle C, serves to connect it with the other battery-wire. The flange A is insulated by hard rubber or otherwise, so as not to have any direct communication with the axle C, and when communication is made the current must pass through the length of the hose E.

In order to make and break connections, we have constructed a peculiar water-proof key; and it consists of an enlarged extension or ball, J, secured to the end of the hose E. Within this ball are placed two plates, K K, of brass or other metal, and one of the wires F is secured to each plate, so that they do not touch. Opposite to these terminal plates is another plate, L, which is connected with the button M upon the outside of the ball, and when the ball is compressed by pressing upon the button it will be seen that the plate L will be forced into contact with both the plates K K, thus completing the connection. When the pressure is removed the elasticity of the rubber throws the plate L out of contact and breaks the connection.

By this construction we are enabled to provide a perfectly water-proof telegraphic key, which will act instantly and at any point, under water or otherwise.

The wires F are thoroughly insulated, and they are perfectly protected within the tubing, so that the communication is never endangered by wet.

Having thus described our invention, what we claim as new, and desire to secure by Letters Patent, is—

1. The reel consisting of the flanges A, non-conducting drum B, with its interior metallic shaft, and the springs G I, for making connection from the battery to the flange A and shaft C, respectively, in combination with the continuous hose E, with the wires F, substantially as herein described.

2. In combination with an elastic connecting medium, E, the operating-key, consisting of the elastic water-proof ball J, with its contained plates K K and L, substantially as herein described.

WM. LUNDBERG.
DANIEL F. LEAHY.

Witnesses:
H. B. NICHOLAS,
E. C. PROTZMAR.